US012571496B2

(12) United States Patent
Wang et al.

(10) Patent No.: US 12,571,496 B2
(45) Date of Patent: Mar. 10, 2026

(54) HEIGHT-ADJUSTABLE MOUNT

(71) Applicant: NINGBO TUOTUO RIVER DESIGN COMPANY, Ningbo (CN)

(72) Inventors: Hong Jun Wang, Ningbo (CN); Yu Jie Zheng, Ningbo (CN)

(73) Assignee: NINGBO TUOTUO RIVER DESIGN COMPANY, Ningbo (CN)

( * ) Notice: Subject to any disclaimer, the term of this patent is extended or adjusted under 35 U.S.C. 154(b) by 19 days.

(21) Appl. No.: 18/620,149

(22) Filed: Mar. 28, 2024

(65) Prior Publication Data

US 2025/0027597 A1     Jan. 23, 2025

(30) Foreign Application Priority Data

Jul. 19, 2023    (CN) ......................... 202310889867.6

(51) Int. Cl.
F16M 11/24        (2006.01)
A47B 97/00        (2006.01)
F16M 11/04        (2006.01)

(52) U.S. Cl.
CPC ......... F16M 11/046 (2013.01); A47B 97/001 (2013.01); F16M 11/24 (2013.01); F16M 2200/047 (2013.01)

(58) Field of Classification Search
CPC ......... F16M 11/26; F16M 11/24; F16M 11/28
USPC ..... 248/295.11, 297, 11, 297.21, 121, 122.1, 248/123.11, 123.2, 125.1, 125.2
See application file for complete search history.

(56) References Cited

U.S. PATENT DOCUMENTS

| | | | | |
|---|---|---|---|---|
| 6,189,849 B1 * | 2/2001 | Sweere | ................. | F16M 11/30 |
| | | | | 248/295.11 |
| 7,407,239 B2 * | 8/2008 | Kunz | ........................ | B60P 3/34 |
| | | | | 312/7.2 |
| 7,784,747 B2 * | 8/2010 | Gan | ........................ | F16M 11/24 |
| | | | | 248/917 |
| 9,624,967 B2 * | 4/2017 | Schlack | ................. | F16M 11/38 |
| 9,631,772 B1 * | 4/2017 | Huang | ................. | F16M 11/046 |
| 11,193,624 B2 | 12/2021 | You | | |
| 12,276,375 B2 * | 4/2025 | Lindelauf | ............ | F16M 13/022 |
| 2010/0294898 A1 * | 11/2010 | Wang | ..................... | F16M 11/24 |
| | | | | 248/122.1 |

(Continued)

*Primary Examiner* — Alfred J Wujciak

(74) *Attorney, Agent, or Firm* — Knobbe Martens Olson & Bear LLP

(57)        ABSTRACT

The present application provides a height-adjustable mount, comprising a first frame assembly, a second frame assembly, a rotation assembly, and a balance assembly. The first frame assembly includes a first frame and a middle connecting plate connected to the first frame. The first frame assembly is slidably disposed relative to the second frame assembly. Two rotation assemblies are symmetrically disposed along the first direction, and each rotation assembly includes a first rotating member and a second rotating member. The balance assembly includes two elastic arrangements symmetrically disposed along the first direction. Wherein the rotation assemblies enable the first frame to move up and down relative to the second frame and stop at any position under the action of an external force, and the elastic force generated by the elastic arrangement, the first elastic member and the second elastic member is used to counteract the gravity of the load of the first frame.

15 Claims, 11 Drawing Sheets

(56)                References Cited

U.S. PATENT DOCUMENTS

| 2020/0032953 | A1* | 1/2020 | Chen | ................... | F16M 13/022 |
| 2020/0103069 | A1* | 4/2020 | You | ..................... | F16M 11/046 |

* cited by examiner

232

45（40）

45（40）

411
411 } 41（40）

43

32（30）

44（40）

31（30）

21（20）

22（20）

23（20）

W
L
H

241

47

411

231

49

42

42

49

HEIGHT-ADJUSTABLE MOUNT

CROSS-REFERENCE TO RELATED APPLICATIONS

This application claims the benefit of CN application No. 202310889867.6, filed Jul. 19, 2023.

TECHNICAL FIELD

This application relates to the technical field of television mounting equipment, and in particular, to a height-adjustable mount for a television or other display.

BACKGROUND

To save space, displays such as touch screens and flat-panel televisions are often fixed to a wall. Once the installation is complete, the installation height of the display is not adjustable, so a poor user experience will be produced due to the different needs of the users. Take a touch screen as an example, the fixed position of a touch screen cannot meet the operational needs of all users. For instance, some underage children are short, and cannot operate the touch screen installed in line with the height of the adult position. Flat-panel televisions provide another example, with most users choose to fix the television on the wall using a wall mount that provides the advantage of occupying a small space. When different people watch the television, the center of the television's height and the eye level of the viewers may not be at the same level because the height of the television cannot be adjusted, resulting in a poor and uncomfortable viewing experience.

SUMMARY

The purpose of the present application is to provide a height adjustable mount that allows for the height of the display to be adjusted after it is installed through the mount, so as to meet the operation or viewing needs of different users.

In one example, a height-adjustable mount can include: a first frame assembly, a second frame assembly, a rotating assembly, and a balancing assembly; wherein the first frame assembly is slidably disposed relative to the second frame assembly; the first frame assembly comprises a first frame and a middle connecting plate connected to the first frame; the rotation assembly includes a first rotating member and a second rotating member, wherein one end of the first rotating member rotationally couples with the bottom of the second frame assembly, wherein the other end of the first rotating member rotationally couples with one end of the second rotating member, and the other end of the second rotating member rotationally couples with the middle connecting plate; the balance assembly includes an elastic arrangement, the upper end of the elastic arrangement is connected to the top of the second frame assembly, wherein the lower end of the elastic arrangement is connected to the first rotating member.

In some embodiments, the connection point of the lower end of the elastic arrangement and the first rotating member is located between the two ends of the first rotating member.

In some embodiments, the rotation assembly is symmetrically disposed in two groups along the first direction L, the balance assembly includes two elastic arrangements symmetrically disposed along the first direction L, and there is a one-to-one correspondence between the rotation assembly and the elastic arrangements.

In some embodiments, the balance assembly further includes a first elastic member; wherein one end of the first elastic member connects to the first rotating member, and the other end of the first elastic member connects to the second frame assembly; and/or, wherein the balance assembly further includes a second elastic member, wherein one end of the second elastic member connects to the second rotating member, and the other end of the second elastic member connects to the middle connecting plate.

In some embodiments, the balance assembly further includes a connecting member, and the first rotating member includes a protruding portion disposed along the width direction of the first rotating member; the second frame assembly includes a second frame and a first connecting plate disposed at the bottom of the second frame; the first connecting plate is provided with a rotating shaft that is located above the protruding portion; the connecting member is provided around the second rotating shaft; one end of the connecting member is connected to the elastic arrangement, and the other end of the connecting member is connected to the protruding portion; the connecting member may be a chain or a rope.

In some embodiments, the connecting member is a chain, and a second rotating shaft is provided with a gear; the chain is disposed around a gear and meshes with the gear.

In some embodiments, the balance assembly further includes a connecting member, the connecting member is a chain, one end of the connecting member is connected to the elastic arrangement, and the other end of the connecting member is connected to the first rotating member, the chain is disposed around a gear and meshes with the gear, the gear is provided on the second frame assembly.

In some embodiments, the height-adjustable mount further includes a first adjusting screw symmetrically disposed used for adjusting the stretched length of the elastic arrangement; the elastic arrangement is connected to the top of the second frame through one corresponding first adjusting screw.

In some embodiments, the first frame is provided with a guide rail parallel to the middle connecting plate; the second frame is provided with a side wheel; and the guide rail cooperates with the side wheel to allow the first frame assembly to slide relative to the second frame assembly.

In some embodiments, the side wheels are arranged in two columns along the sliding direction of the first frame assembly, every other center of the circles of the two columns of the side wheels is aligned, and each column of side wheels respectively cooperates with a front sidewall or a rear sidewall of the guide rail.

In some embodiments, the height-adjustable mount further includes a second adjusting screw; wherein the second frame assembly is provided with an assembly section disposed above the connection joint of the first rotating member and the second frame assembly; one end of the second adjusting screw is rotationally connected to the assembly section, and the other end is connected to the first elastic member, adjusting the second adjusting screw to retract or extend the first elastic member.

In some embodiments, the first frame is provided with two stop portions that are disposed at the top and bottom of the first frame; the bottom of the second frame is provided with a fitting section for cooperating with the stop portion so that controlling the sliding distance of the first frame.

In some embodiments, the height-adjustable mount further includes a front cover disposed in the front side of the second frame assembly; the front cover is provided with a first window at a position corresponding to the elastic arrangement; the front cover comprising a first scale at a position proximate to the first window in the direction of extension of the first window.

In some embodiments, the height-adjustable mount further includes a second connecting plate that snapped in front of the first frame assembly, and the edges of the second connecting plate are fixedly connected to the second frame assembly; the second connecting plate includes at least two guide wheels; the guide wheels are disposed on two sides of the middle connecting plate, and the circumferential walls of the guide wheels can be contacted with two sides of the middle connecting plate.

In some embodiments, the second connecting plate is provided with a second window at a position corresponding to the first elastic member; the first elastic member includes a second indicator at a position corresponding to the second window, and the second connecting plate is provided with a second scale at a position near the second window along the extension direction of the second window.

Embodiments of the present disclosure can provide a height-adjustable mount with a simple and thinner structure, and stable and smooth up and down movements. The rotation assembly is symmetrically disposed in two groups, so when the rotation assembly drives the middle connecting plate to move, the first frame is subjected to a more uniform force and slides up and down more smoothly relative to the second frame assembly. The second rotating member and the first rotating member are rotationally connected; the first rotating member is rotationally connected to the second connecting plate; the second rotating member is rotationally connected to the middle connecting plate. Thereby the rotating assembly can be moved in a direction in which the angle between the two is gradually reduced under the action of an external force, or can be moved in a direction in which the angle between the two is gradually increased under the action of an external force. Therefore, the height of the equipment hanging on the mount can be changed through the up and down movements of the first frame, so that meeting more needs. The elastic arrangement is capable of generating a reverse force in the opposite direction of movement, making the display balanced and stably positioned at any height through the balance assembly. As the first frame assembly is disposed to slide relative to the second frame assembly, the first frame can slide up and down relative to the second frame assembly under the driving of the rotation assembly, and can be stably positioned at any height as required under the action of the balancing assembly.

BRIEF DESCRIPTION OF THE DRAWINGS

In order to explain the embodiments of the present application more clearly, the drawings used in the embodiments will be described briefly in the following, and it is apparent that the drawings in the description below are only some embodiments of the present application and those skilled in the art can obtain other embodiments according to these drawings without creative efforts.

FIG. 3b is an enlarged view of part I of FIG. 3a;

DETAILED DESCRIPTION OF THE
INVENTION

The technical solutions in the embodiments of the present disclosure will be clearly and completely described below with reference to the attached drawings. The described embodiments are only some of the embodiments of the present disclosure, rather than all the embodiments. Based on the embodiments in the present disclosure, all other embodiments obtained by those of ordinary skill in the art based on this application fall within the protection scope of the present disclosure.

Figure 1:
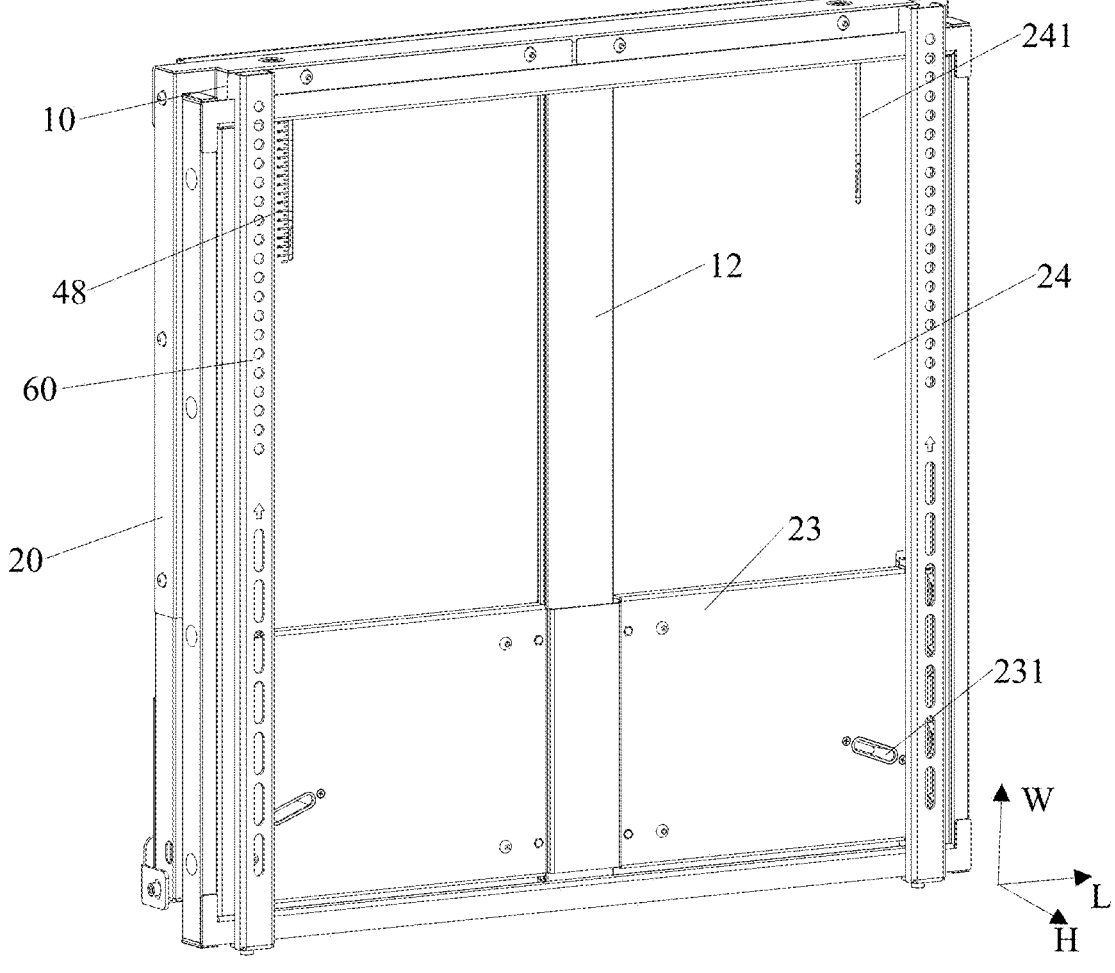
FIG. 1 is a diagram of the overall structure of the height-adjustable mount provided by an embodiment of the present application.
Figure 2:
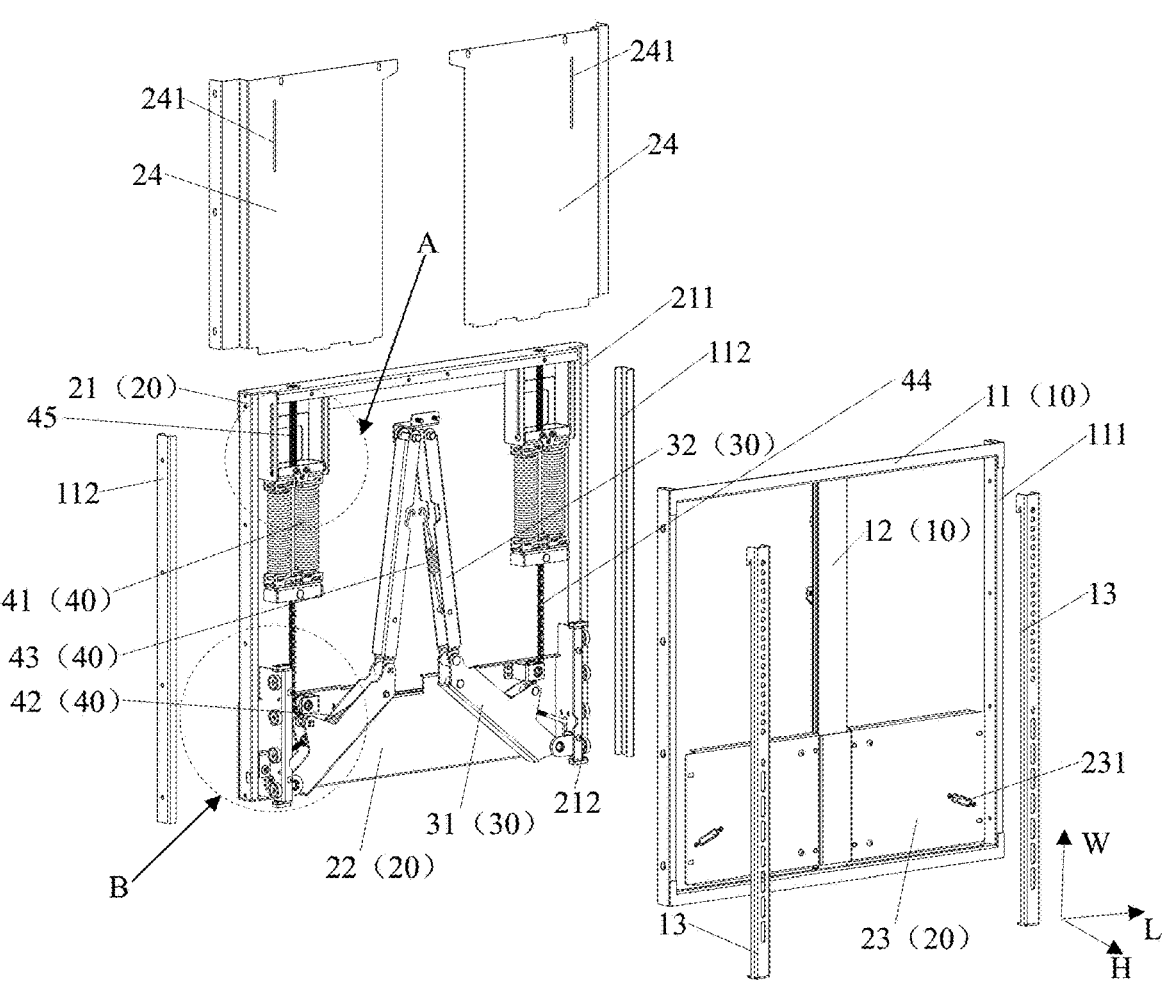
FIG. 2 is an exploded view of the height-adjustable mount of FIG. 1.

A height-adjustable mount is provided as shown in FIG. 1 and FIG. 2, comprising a first frame assembly 10, a second frame assembly 20, a rotation assembly 30 and a balance assembly 40. The first frame assembly 10 is slidably disposed relative to the second frame assembly 20. The first frame assembly 10 includes a first frame 11 and a middle connecting plate 12 that connects to the first frame. The rotation assembly 30 is symmetrically disposed in two groups along the first direction L, and each group of rotation assembly 30 includes a first rotating member 31 and a second rotating member 32. One end of the first rotating member 31 rotationally couples with the bottom of the second frame assembly 20. The other end of the first rotating member 31 rotationally couples with the second rotating member 32. The upper end of the second rotating member 32 rotationally couples with the middle connecting plate 12. The balance assembly 40 includes two elastic arrangements 41 symmetrically disposed along the first direction L. The upper end of each elastic arrangement 41 is connected to the top of the second frame assembly 20, and the lower end of each elastic arrangement 41 is connected to the respective corresponding first rotating member 31, and the connection point of the lower end of the elastic arrangement 41 and the first rotating member 31 is located between the two ends of the first rotating member 31.

In the illustrated embodiment, the first direction L is a direction perpendicular to the sliding direction, and the second direction W is the sliding direction, specifically the first direction L and second direction W are the length and width directions of the height-adjustable mount respectively, and the third direction H is the thickness direction of the height-adjustable mount. The second frame assembly 20 is used for mounting on a wall, and the first frame 11 is used for mounting a device to be lifted, such as a display screen that may be but is not limited to, a flat-panel display, a touch screen, and more. A connection is established between the first frame assembly 10 and the second frame assembly 20 by using the rotation assembly 30 and the balance assembly 40. The rotation assembly 30 is symmetrically provided in two groups, so when the rotation assembly 30 drives the middle connecting plate 12 to move, the first frame 11 is subjected to a more uniform force and slides up and down more smoothly relative to the second frame assembly 20. The second rotating member 32 and the first rotating member 31 are rotationally connected, and the first rotating member 31 is rotationally connected to the second frame assembly 20, and the second rotating member 32 is rotationally connected to the middle connecting plate 12, so that the rotating assembly 30 can be moved in a direction in which the angle between the two is gradually reduced under the action of an external force, or can be moved in a direction in which the angle between the two is gradually increased under the action of an external force. Therefore, the first frame 11 realizes the up or down movement to change the height of the mounted device to meet the needs of different users. The elastic arrangement 41, which can be for example, a spring, is capable of generating a reverse force in the opposite direction of movement, making the display balanced and stably positioned at any height through the balance assembly 40. As the first frame assembly 10 is disposed to slide relative to the second frame assembly 20, the first frame 11 can slide up and down relative to the second frame assembly 20 under the driving of the rotation assembly 30, and can be stably positioned at any height as required under the action of the balancing assembly 40.

The height-adjustable mount provided by the embodiments of the present application features a simple structure and easy operation, which adjusts the first frame 11 relying on the rotation assembly 30, and keeps it stable by the balance assembly 40. As shown in FIG. 2, the elastic arrangement 41 is distributed on both sides of the rotation assembly 30, which can reasonably utilize the space between the first frame assembly 10 and the second frame assembly 20, so that the orthographic projections of the two in the third direction H do not overlap, and thus the thickness of the height-adjustable mount can be further reduced.

More specifically, the middle connecting plate 12 is disposed in the middle of the first frame 11 along the second direction W. The first frame 11 includes two mounting brackets 13, the mounting brackets 13 are disposed on a side of the first sidewall 111 of the first frame 11 away from the second frame assembly 20. The first sidewall 111 consists of two sides that extend along the second direction W of the first frame 11. The mounting brackets 13 are used to support the device to be lifted. The first rotating member 31 and the second rotating member 32 are disposed one above the other along the second direction W.

Figure 6:
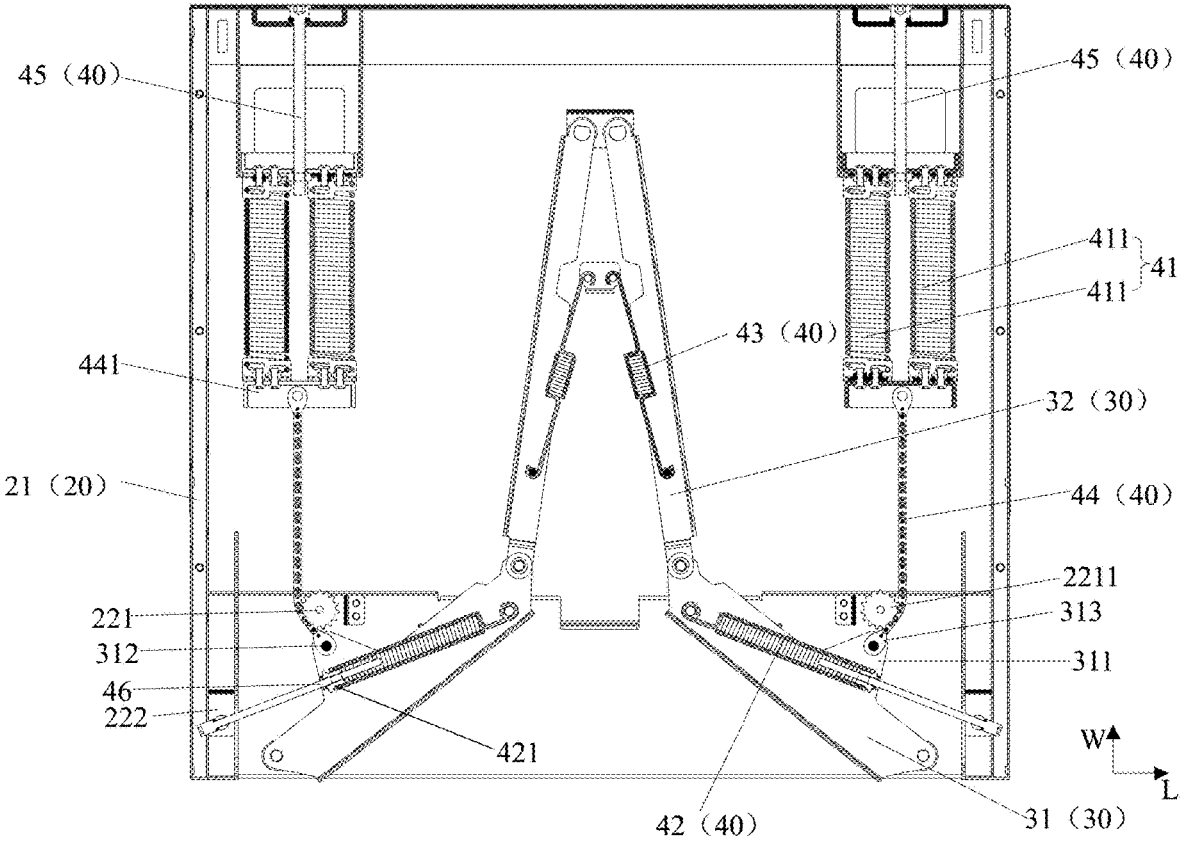
FIG. 6 is a cutaway view of the first frame assembly at the highest position.
Figures 7, 8:
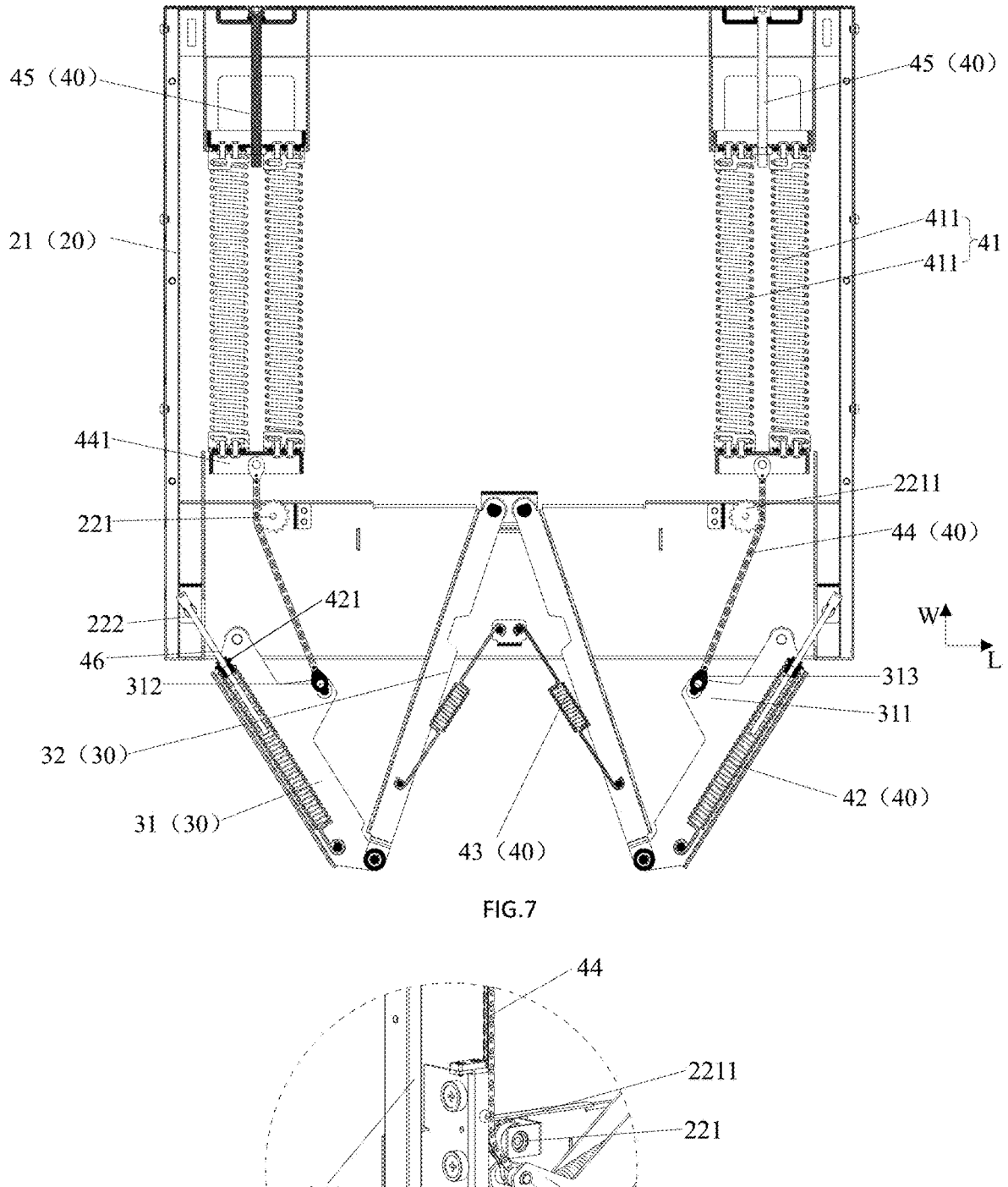
FIG. 7 is a cutaway view of the first frame assembly at the lowest position.
FIG. 8 is an enlarged view of part B of FIG. 2.
Figure 9:
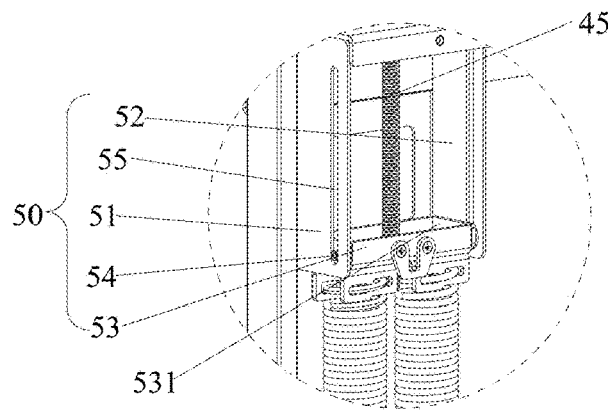
FIG. 9 is an enlarged view of part A of FIG. 2.
Figure 10:
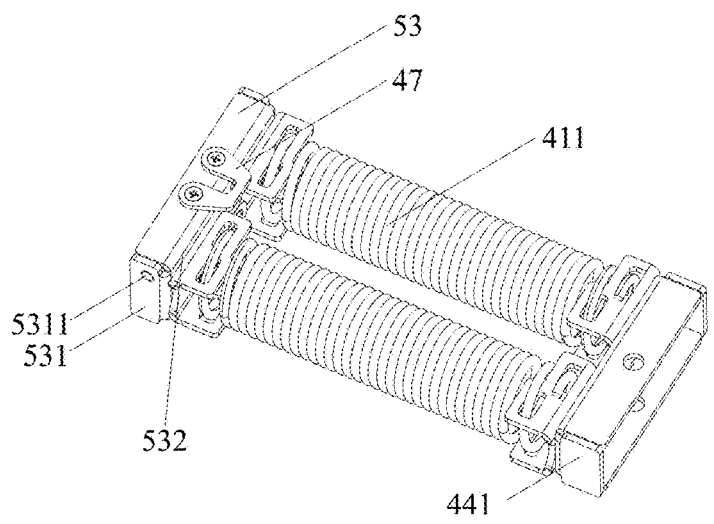
FIG. 10 is a diagram showing the connecting structure of the elastic portion.
Figure 11:
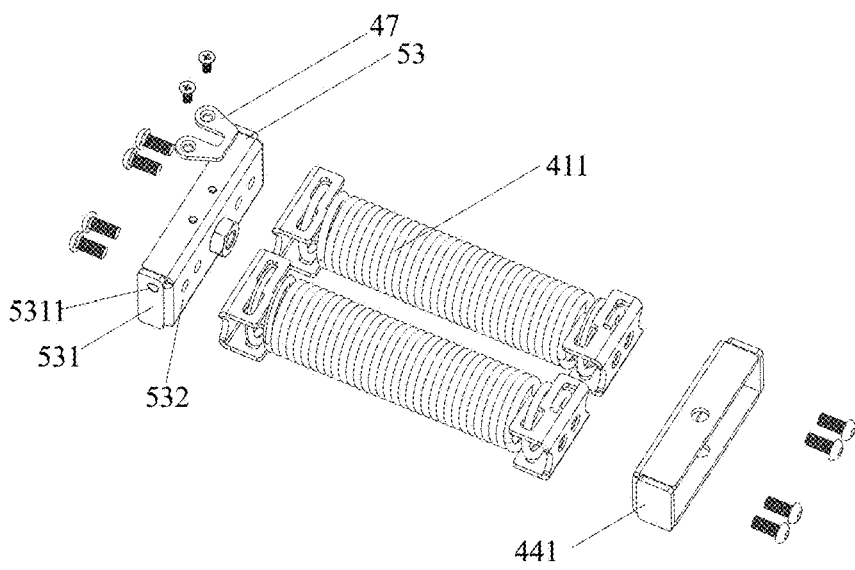
FIG. 11 is an exploded view of the connecting structure of the elastic portion of FIG. 10.
Figure 12:
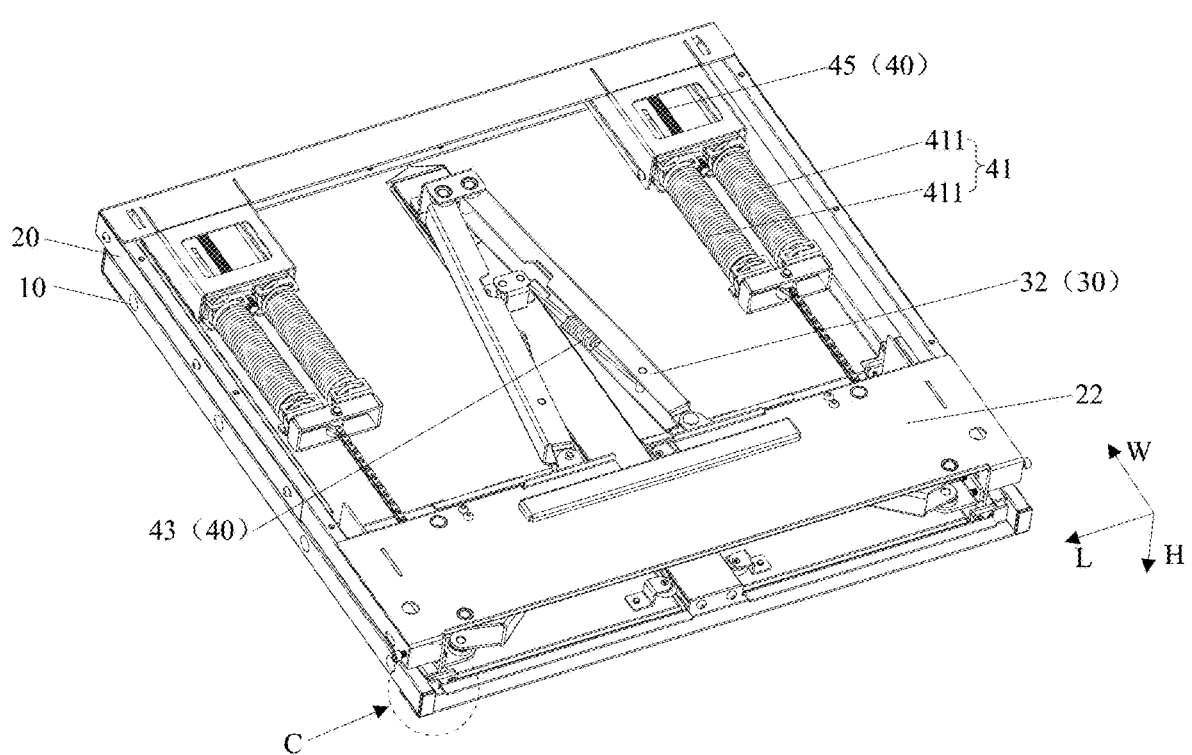
FIG. 12 is the other schematic view of the first frame assembly at the highest position.
Figure 13:
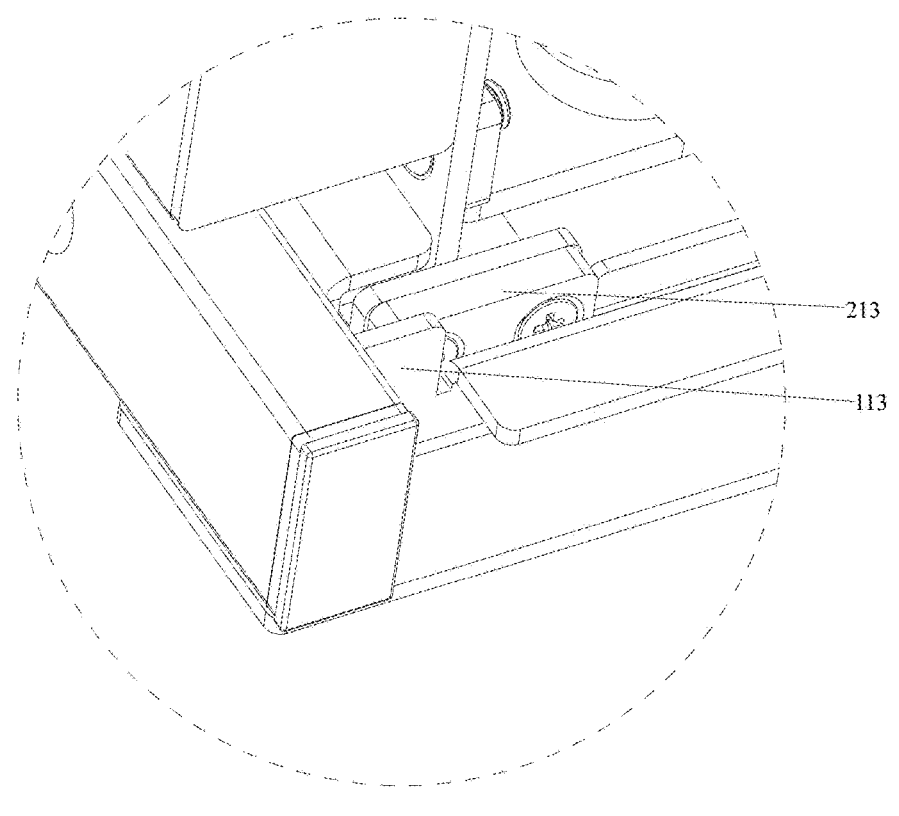
FIG. 13 is an enlarged view of part C of FIG. 12.
Figure 14:
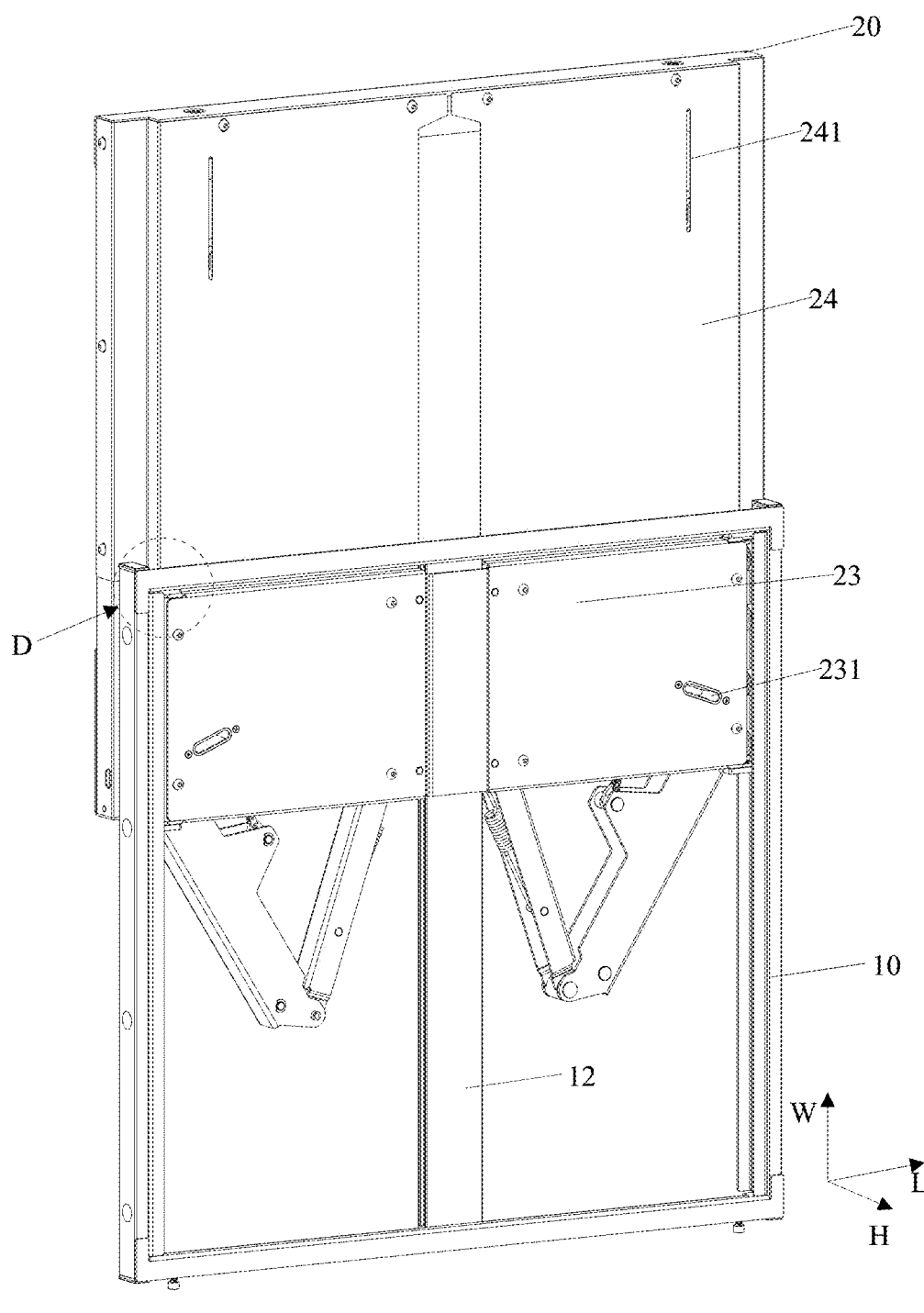
FIG. 14 is the other schematic view of the first frame assembly at the lowest position.
Figure 15:
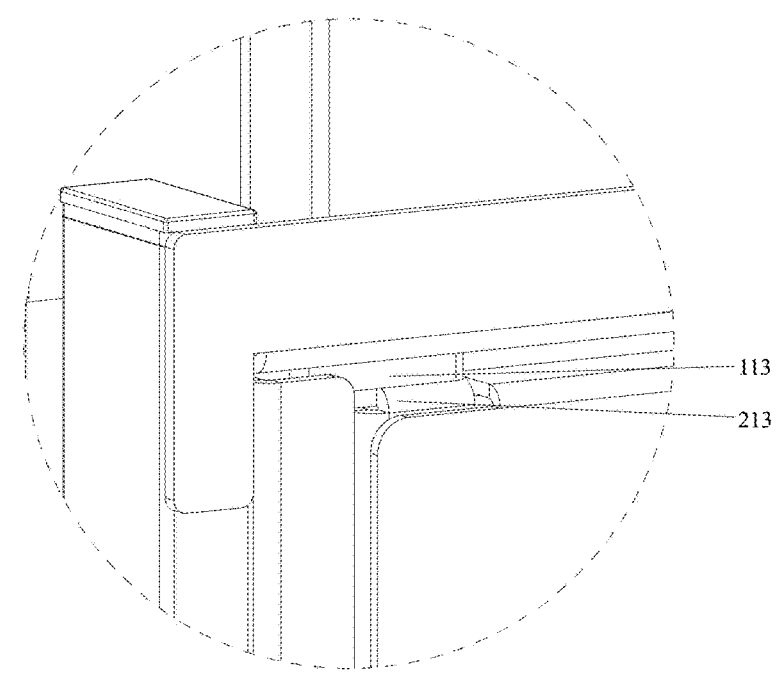
FIG. 15 is an enlarged view of part D of FIG. 14.

Further, as shown in FIGS. 6 and 7, the balance assembly 40 comprises two first elastic members 42, which can be, for example, springs, a first end of each first elastic member 42 being connected to a corresponding first rotating member 31, and a second end of each first elastic member 42 being connected to a corresponding second frame assembly 20; and/or, the balance assembly 40 also comprises two second elastic members 43 (e.g., springs), the lower end of each second elastic member 43 being connected to a corresponding second rotating member 32, and the upper end of each second elastic member 43 being connected to the middle connecting plate 12.

Figure 3A:
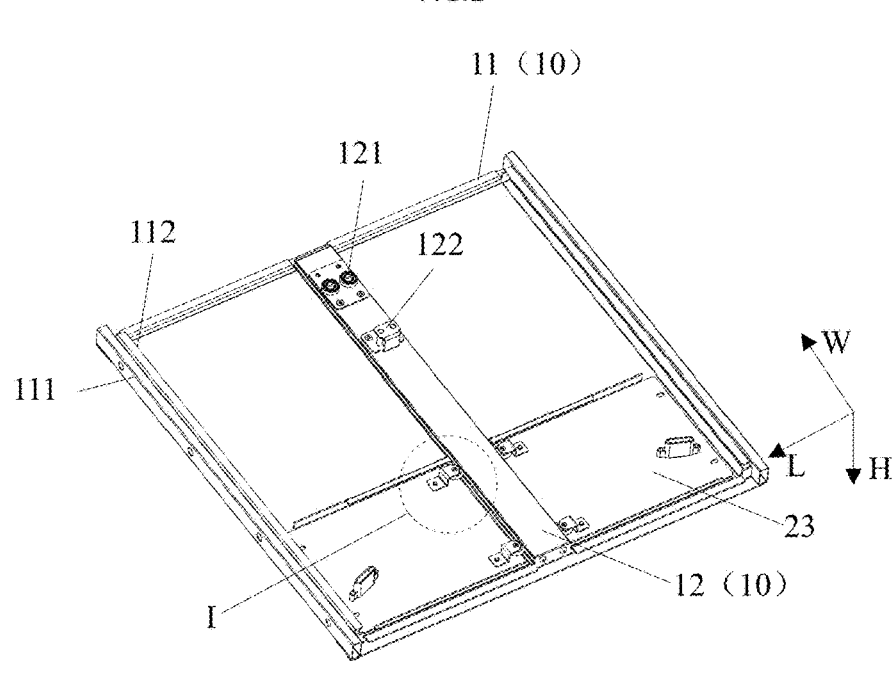
FIG. 3a is a diagram of the first frame assembly from the view facing the second frame assembly.

Specifically, as shown in FIGS. 3a, 7, and 8, such rotational connection of the second rotating member 32 and the middle connecting plate 12, for example, may be a hinged connection, namely the second rotating member 32 is secured to the middle connecting plate 12 by a second hinge point 121. The second elastic member 43 and the middle connecting plate 12 may also be rotationally connected, for example, may be hinged, namely the second elastic member 43 is secured to the middle connecting plate 12 by a second hinge point 122. The first elastic member 42 and the second elastic member 43 may be springs.

In this embodiment, the first elastic member 42 and the second elastic member 43 are capable of respectively and effectively lifting and pulling the first rotating member 31 and the second rotating member 32, so that the first elastic member 42 and the second elastic member 43 together with the elastic arrangement 41 can counteract the gravity of the load to be hung by the height-adjustable mount. The elastic arrangement 41 together with the first elastic member 42 and the second elastic member 43 generate an elastic force for counteracting the gravity of the load of the first frame 11, which further enhances the weight capacity of the height-adjustable mount for a smooth and steady height adjustment.

In some embodiments, as shown in FIGS. 3-7, the balance assembly 40 further includes a connecting member 44, and the first rotating member 31 includes a protruding portion 311 disposed along the width direction of the first rotating member 31. The second frame assembly 20 includes a second frame 21 and a first connecting plate 22 disposed at the bottom of the second frame 21. The first connecting plate 22 is provided with a second rotating shaft 221 that is located above the protruding portion 311. The connecting member 44 is provided around the second rotating shaft 221; one end of the connecting member 44 is connected to the elastic arrangement 41, and the other end of the connecting member 44 is connected to the protruding portion 311. The connecting member 44 may be a chain or a rope.

In this embodiment, the setting of connecting member 44 and second rotating shaft 221 allows the tension of the elastic arrangement 41 to always remain in a vertical direction, and connecting member 44 changes direction after passing through the second rotating shaft 221, which facilitates the formation of a tension force on the first rotating member 31 and allows the connecting member 44 to always remain tensioning so that provides effective pulling on the first rotating member 31.

As a feasible approach, as shown in FIGS. 6 and 7, the connecting member 44 may be a chain or a rope. Either the chain or the rope is easy to change direction, and the change in direction is all tension on the second rotating member 32.

Further, as shown in FIGS. 6-8, the connecting member 44 is a chain, and the second rotating shaft 221 is provided with a gear 2211. The chain is disposed around and meshed with the gear 2211.

In this embodiment, the chain meshes with the gear 2211 for better smoothness and strength, avoiding sliding friction and reducing damage.

Further, the protruding portion 311 is provided with a first rotating shaft 312, and the connecting member 44 and the protruding portion 311 are rotationally connected by the first rotating shaft 312.

Wherein, as shown in FIGS. 6-8, a chain and a first rotating shaft 312 can be rotationally connected by a cam 313, which can minimize the size of the cam 313 and reduce the risk of interfering with other components while having enough space to set up a connection hole for installing the chain.

As a specific feasible way, as shown in FIGS. 1-7, one end of the first rotating member 31 is rotationally connected to the first connecting plate 22, and the other end of which is rotationally connected to the second rotating member 32. The upper end of the second rotating member 32 is rotationally connected to the middle connecting plate 12. The balance assembly 40 comprises two elastic arrangements 41, two first elastic members 42, and two second elastic members 43 symmetrically disposed along the first direction L. Along the second direction W, the upper end of each elastic arrangement 41 is connected to the top end of the second frame 21, and the lower end of which is connected to a corresponding first rotating member 31. One end of each first elastic member 42 is connected to a corresponding first rotating member 31, and the other end of which is connected to the first connecting plate 22. The lower end of each second elastic member 43 is connected to a corresponding second rotating member 32, and the upper end of which is connected to the middle connecting plate 12.

In some embodiments, as shown in FIGS. 4-7, the height-adjustable mount further comprises two first adjusting screws 45 symmetrically disposed along the first direction L. Each elastic arrangement 41 is connected to the top of the second frame 21 through one corresponding first adjusting screw 45, and the top of the first adjusting screw 45 is threadedly connected to the top of the second frame 21.

In this embodiment, the first adjusting screw 45 is threaded to the top of the second frame 21, and the stretching length of the elastic arrangement 41 can be adjusted by screwing it in or out to accommodate displays of different weights.

In some embodiments, as shown in FIG. 2, FIGS. 9-11, the height-adjustable mount further comprises two stop assemblies 50 disposed corresponding to two first adjusting screws 45. Each stop assembly 50 includes a first baffle 51 and a second baffle 52 set with a gap along the first direction L, as well as a stop connecting element 53 and a stop pin 54 connected to the bottoms of the first baffle 51 and the second baffle 52. The first baffle 51 and second baffle 52 are fixed to the second frame 21. Each stop connecting element 53 includes two third sidewalls 531 provided in parallel with the first baffle 51 and the second baffle 52, and a bottom wall 532 connected to the two third sidewalls 531. The first adjusting screw 45 is threadedly connected to the bottom wall 532, and the elastic arrangement 41 is fixed to the bottom wall 532. Two third sidewalls 531 are provided with pin holes 5311, the first baffle 51 and the second baffle 52 are provided with sliding slots 55 connected to the pin holes 5311. Passing through pin holes 5311 and sliding slots 55, the stop pins 54 restrict the movement of the elastic arrangements 41 by controlling the movement of the stop connecting elements 53.

In this embodiment, the stop assembly 50 is provided for restricting the movement of the elastic arrangement 41, so that the elastic arrangement 41 does not move together with the first adjusting screw 45 during the adjustment process, facilitating the adjustment of the first adjusting screw 45, wherein the first baffle 51 and the second baffle 52 are fixed to the second frame 21, and it can be that the tops of the first baffle 51 and the second baffle 52 are connected to the top of the second frame 21.

In some embodiments, each elastic arrangement 41 comprises at least two third elastic members 411, both upper ends of third elastic members 411 being coupled to the bottom wall 532, and lower ends of third elastic members 411 being coupled to the connecting member 44.

In this embodiment, the elastic arrangement 41 comprises two or more third elastic members 411, which can be, for example, springs, which can increase the resultant force of the elastic arrangement 41 and the weight capacity of the height-adjustable mount. Therein, the bottom of the third elastic member 411 may connect to the connecting member 44 with the help of a connecting adaptor 441, namely, both of the third elastic members 411 are connected to the top end of the connecting adaptor 441, and the connecting member 44 is connected to the bottom end of the connecting adaptor 441, and specifically, the connecting adaptor 441 may be a bar-shaped block. The connection between two or more third elastic members 411 and the connecting member 44 by the connecting adaptor 441 facilitates keeping the elasticity direction of all third elastic member 411 the same and vertical, which can maximize the resultant force of the plurality of elastic members so that effectively stretch the connecting member 44.

It will be appreciated that the third elastic member 411 may be a spring. The elastic arrangement 41 may also have only one third elastic member 411. When the elastic arrangement 41 has only one third elastic member 411, the third elastic member 411 could be directly connected to the connecting member 44.

In some embodiments, as shown in FIGS. 2 and 3, the first frame 11 is provided with guide rails 112 parallel to the middle connecting plate 12. The second frame 21 is provided with two groups of side wheels 212, and each guide rail 112 cooperates with one group of side wheels 212 to allow the first frame assembly 10 to slide relative to the second frame assembly 20.

In this embodiment, side wheels 212 define the left-right offset of guide rails 112 by the cooperation between them, which ensures the first frame 11 slides relative to the second frame 21 following the established route and sliding trajectory from being offset. And when the first frame assembly 10 slides relative to the second frame assembly 20, the friction and damages can be further reduced because of the small contact area between them, which ensures a longer use life.

Specifically, as shown in FIG. 3, the guide rails 112 are disposed on one side of the first frame 11 near the second frame 21 and on the inside of the first sidewall 111. The first sidewalls 11 are two sidewalls of the first frame 11 extending in the second direction W, and the inside of the first sidewall 111 means that it is disposed in the inside of the first frame 11 and close to the first sidewall 111. The second frame 21 is provided with side wheels 212 on a side near the first frame 11, and the side wheels 212 are disposed on the two second sidewalls 211 of the second frame 21 opposite the first frame 11. The opening direction of a guide rail 112 faces the opposite side of the first sidewall 111, namely the guide rail 112 cooperates with the side wheel 212 along the first direction L, which is conducive to reducing the thickness of the height-adjustable mount It should be noted that the present application is not limited to the side wheel 212 for the structure that cooperates with the guide rail 112, but can also be provided with an elongated projection, as long as it can cooperate with the guide rail 112 to play a limiting role.

More preferably, each group of side wheels 212 is arranged in two columns along the sliding direction of the first frame assembly 10, every other center of the circle of the two columns of the side wheels 212 is aligned, and each column of the side wheels 212 respectively cooperates with a front sidewall or a rear sidewall of the guide rail 112.

In this embodiment, the side wheels 212 are arranged in two columns along the sliding direction that is the second direction W. Two adjacent side wheels 212 are not in the same column, and each column of side wheels 212 matches with the guide rail 112, allowing the front and rear sidewall of the guide rail to be in contact with the side wheels 212 so that reduces wobbling during the up and down sliding of the first frame assembly 10.

In some embodiments, as shown in FIGS. 6 and 7, the second frame assembly 20 is provided with the assembly section 222 disposed above the connection of the first rotating member 31 and the second frame assembly 20. The first elastic member 42 is rotationally connected to the assembly section 222. The height-adjustable mount further includes a second adjusting screw 46. One end of the second adjusting screw 46 is rotationally connected to the assembly section 222, and the other end is connected to the first elastic member 42, adjusting the second adjusting screw 46 to retract or extend the first elastic member 42.

In this embodiment, the first elastic member 42 is connected to the second frame assembly 20. The second frame assembly 20 is provided with assembly sections 222 above the connection joint of the second rotating member 32 and the second frame assembly 2, so that the partial force of the first elastic member 42 can counteract a part of the gravity of the device to be mounted, and make a contribution to the force balance of the height-adjustable mount. The arrangement of the second adjusting screw 46 allow the length of the first elastic member 42 being adjustable, which is helpful for adapting different weights of the equipment to be lifted, and improves the applicability of the height-adjustable mount.

Specifically, the first connecting plate 22 of the second frame assembly 20 is provided with assembly sections 222. The first elastic member 42 is externally or internally secured with a threaded sleeve 421. The second adjusting screw 46 threadedly couples to a threaded sleeve 421, enabling the second adjusting blot 46 to be screwed in or screwed out along the axial direction of the threaded sleeve 421, thereby adjusting the length of the first elastic member 42.

In some embodiments, as shown in FIGS. 12-15, the first frame 11 is provided with two stop portions 113 that are disposed at the top and bottom of the first frame 11. The bottom of the second frame 21 is provided with a fitting section 213 for cooperating with the stop portion 113 so that controlling the sliding distance of the first frame 11.

In this embodiment, the first frame 11 and the second frame 21 are provided with the stop portion 113 and fitting section 213. When they work together, they can stop the first frame 11 from continuing to slide and prevent the first frame 11 from sliding out of the permissible range otherwise may cause unnecessary damage.

Wherein, the stop portion 113 may be a stop block and the fitting section 213 may be a stop step, or the stop portion 113 may be a stop step and the fitting section 213 may be a sliding slot 55 or a pin hole 5311. Or vice versa, the stop portion 113 may be a sliding slot 55 or a pin hole 5311 and the fitting section 213 may be a stop step, as long as their cooperation can stop the movement of the first frame 11.

Figure 16:
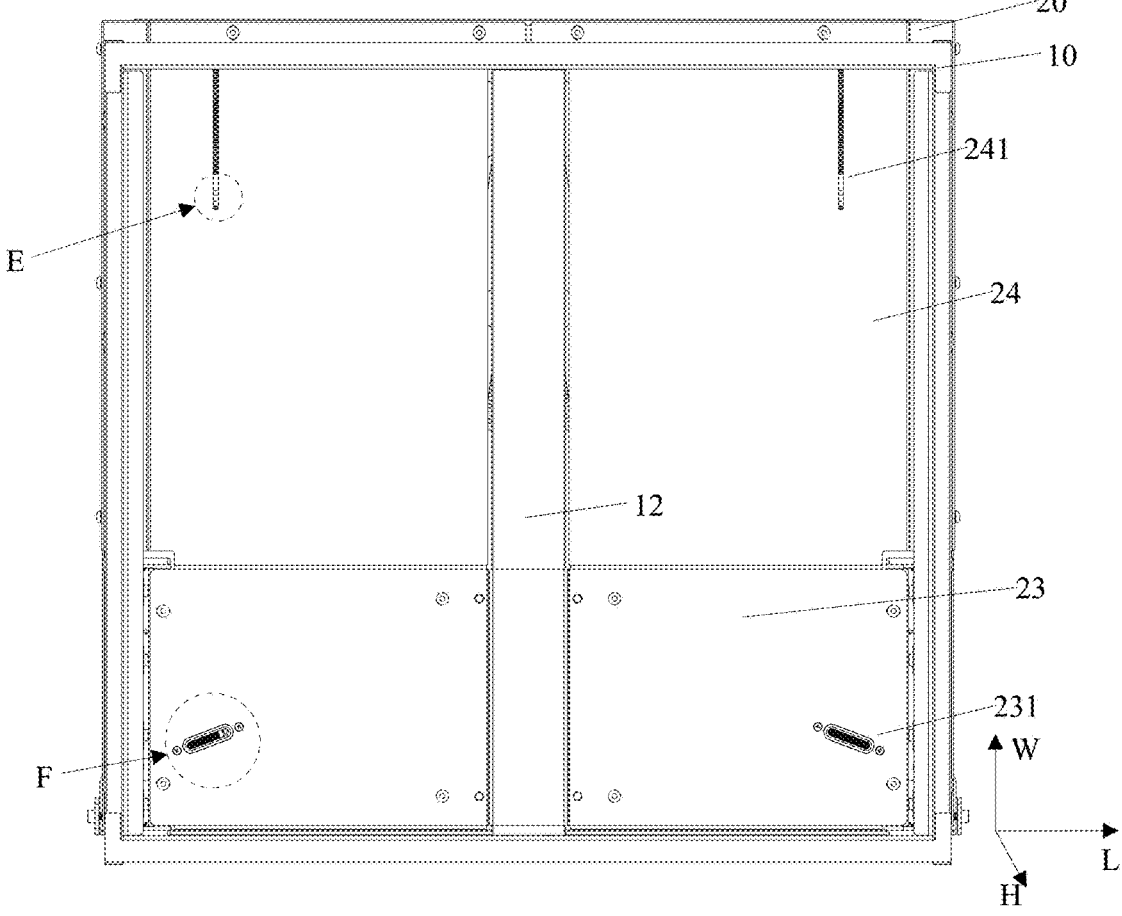
FIG. 16 is the other schematic view of the overall structure of the height-adjustable mount provided by an embodiment of the present application.
Figure 17:
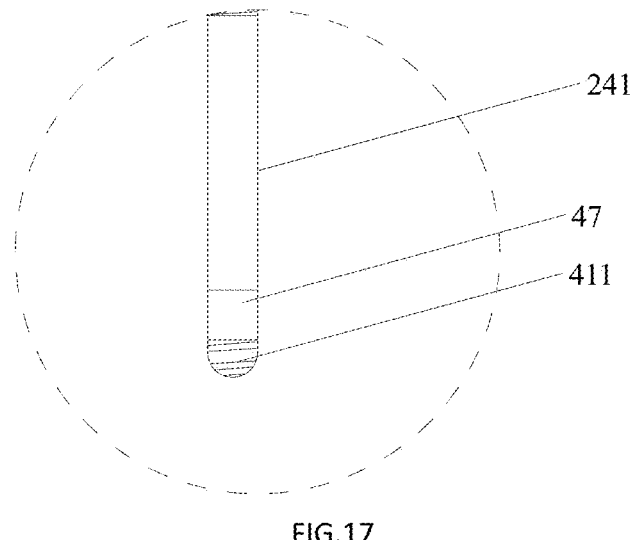
FIG. 17 is an enlarged view of part E of FIG. 16.
Figure 18:
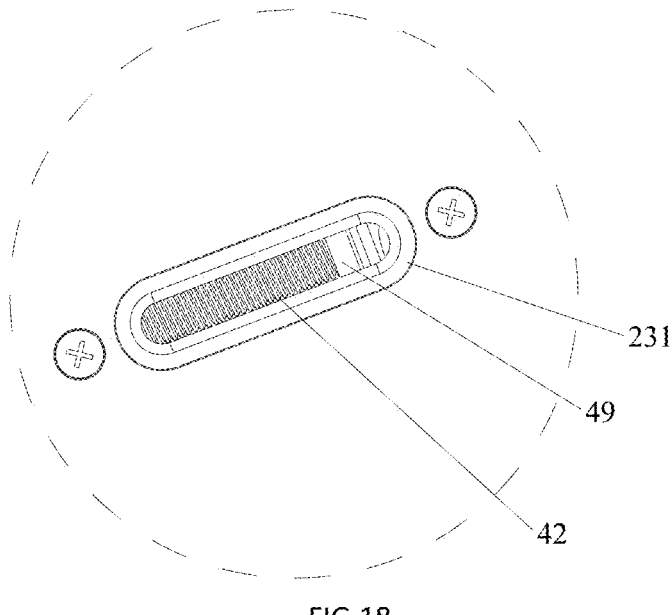
FIG. 18 is an enlarged view of part F of FIG. 16.
Figure 19:
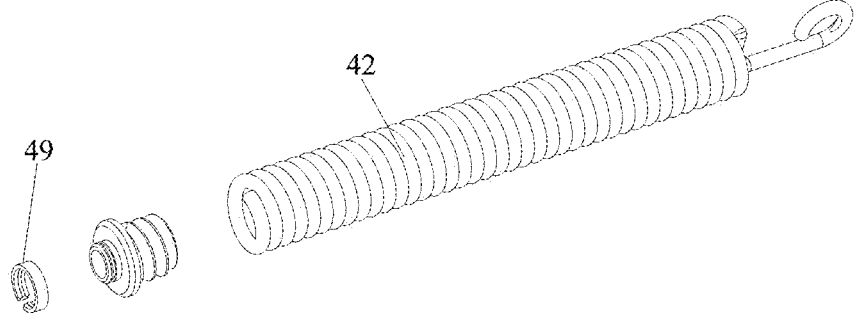
FIG. 19 is a diagram of the first elastic member.

In some embodiments, as shown in FIGS. 1, 2 and 16, the height-adjustable mount further includes two front covers 24 disposed in the front side of the second frame assembly 20. Each front cover 24 is provided with a first window 241 at a position corresponding to the elastic arrangement 41. As shown in FIGS. 1, 2, 10, 11, 16 and 17, the height adjustable mount further includes two stop assemblies 50 at a position corresponding to two first adjusting screws 45 for restricting rotation of the elastic arrangement 41. Each stop assembly 50 is provided with a first indicator 47 at a position corresponding to the first window 241. The front cover 24 comprises a first scale 48 at a position proximate to the first window 241 in the direction of extension of the first window 241.

In this embodiment, the front cover 24 is disposed on the side of the second frame assembly 20 facing the first frame assembly 10, so that the outer surface of the second frame assembly 10 is obscured, which provides better protection for the internal structure of the height-adjustable mount and further enhances the aesthetics of the mount. It is easy to observe the elongation of the first adjusting screw 45 through the first window 241, then roughly estimate whether it matches the weight of the equipment to be lifted. Adjust the first adjusting screw 45 to make the balance assembly 40 match the weight of the equipment to be lifted.

The first scale 48 may be engraved on the periphery of the first window 241 employing silk-screen printing or laser printing, and the first scale 48 may show the actual weight value of the equipment to be lifted or have a certain correspondence with the actual weight of the equipment to be lifted. The weight of the equipment to be lifted can be estimated by the position of the first indicator 47 and its corresponding scale on the first window 241, which helps to identify whether the weight of the equipment to be lifted is over the rated weight capacity, and thus decide whether the first adjusting screw 45 need to be adjusted to make the elastic arrangement 41 matches with the weight of the equipment to be lifted.

Specifically, the first indicator 47 may be disposed at a position of the stop connecting element 53 corresponding to the first window 241.

Further, as shown in FIG. 2, the edges of the front cover 24 are fixedly connected to the second frame 21 (The front cover 24 is not distanced from the first frame 11 in FIG. 2 to show the matching relationship between them). The edge of the front cover 24 near the frame center is curved to avoid interfering with the middle connecting plate 12.

Figure 3B:
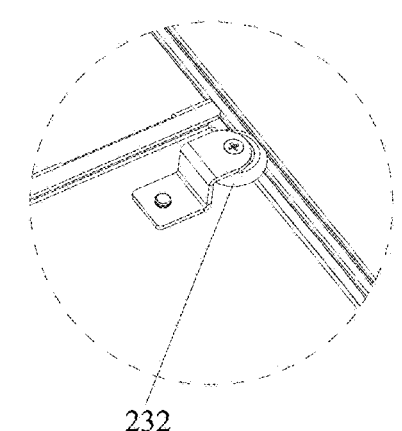
Figure 4:
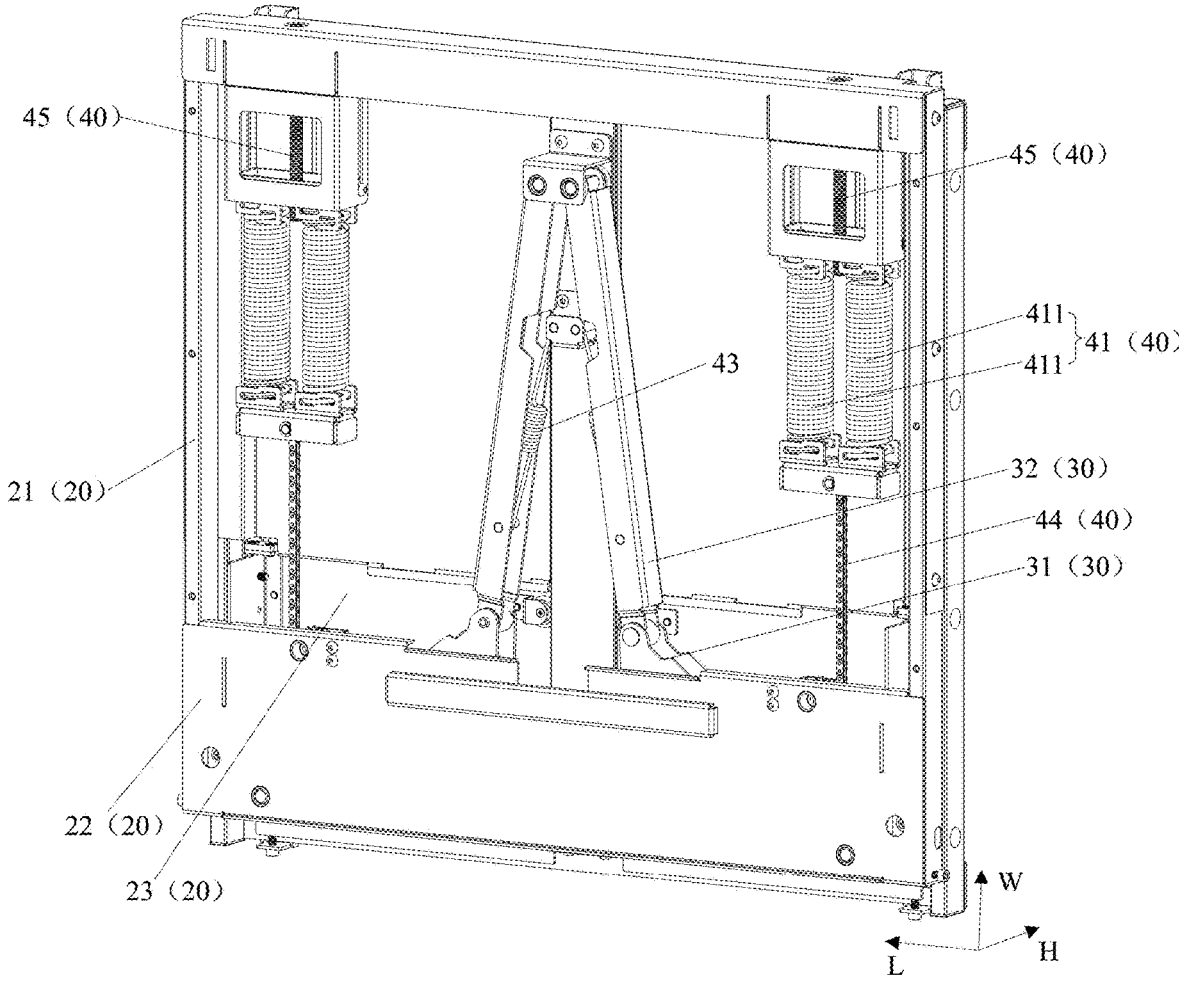
FIG. 4 is a diagram of the first frame assembly at the highest position.
Figure 5:
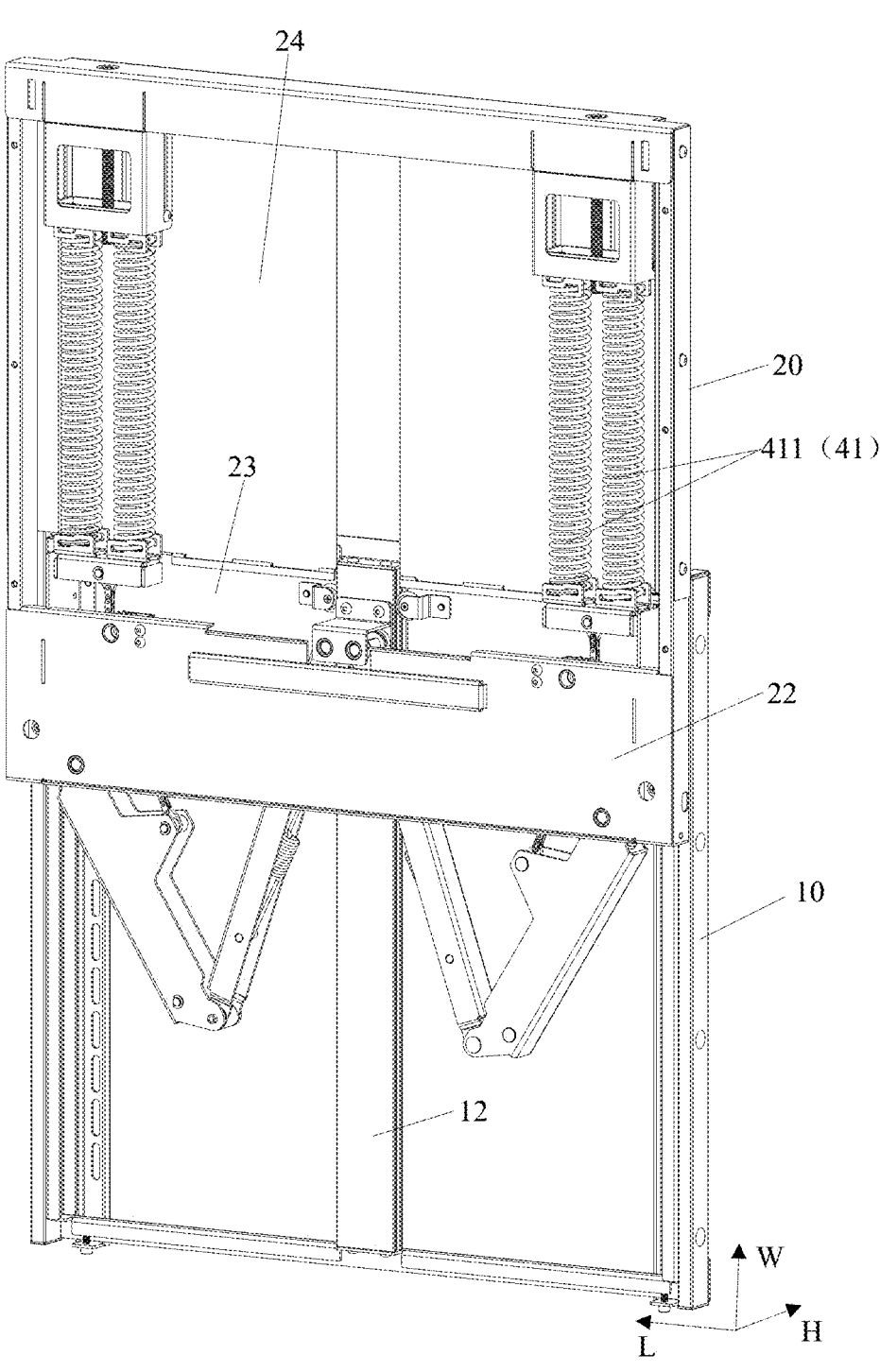
FIG. 5 is a diagram of the first frame assembly at the lowest position.

In some embodiments, as shown in FIGS. 3a and 3b, the height-adjustable mount further comprises a second connecting plate 23 that snapped in front of the first frame assembly 10, and the edges of the second connecting plate 23 are fixedly connected to the second frame assembly 20. The second connecting plate 23 includes at least two guide wheels 232. The guide wheels 232 are disposed on two sides of the middle connecting plate 12, and the circumferential walls of the guide wheels 232 can be contacted with two sides of the middle connecting plate 12.

In this embodiment, the smoothness of the up and down movements of the height-adjustable mount can be improved by providing guide wheels 232 on the second connecting plate 23.

In addition, the second connecting plate 23 may also cover the first frame 11, so that the outer surface of the second frame assembly 20 is more completely obscured, improving the flatness of the appearance of the height-adjustable mount. Wherein the front cover 24 and the second connecting plate 23 together cover the first frame 11, it may be that the orthographic projection of the front cover 24 and the second connecting plate 23 do not overlap or have a partial overlap. It is preferred that the orthographic projection of the front cover 24 and the second connecting plate 23 do not overlap, which saves material and facilitates thinning the thickness of the height-adjustable mount.

Further, the first connecting plate 22 is disposed on the side of the second frame 21 away from the second frame assembly 20, and the second connecting plate 23 is disposed on the side of the first frame 11 away from the second frame assembly 20. Thereby the balance assembly 40 and the rotating assembly 30 are arranged between the first connecting plate 22 and the second connecting plate 23, which helps reduce the thickness of the height-adjustable mount and hides and protects the internal structure, making the appearance of the height-adjustable mount looks more minimalist and generous.

More specifically, as shown in FIG. 2, the second connecting plate 23 attaches to the second frame assembly 20 using the left and right screws. The second connecting plate 23 is provided with an avoidance portion at a position corresponding to the middle connecting plate 12 for leaving space for the middle connecting plate 12. Thereby the surface keeps flat after assembling the middle connecting plate 12 and the second connecting plate 23. And the overall thickness of the height-adjustable mount is reduced. Moreover, when the middle connecting plate 12 drives the first frame 11 to move, the second connecting plate 23 can remain motionless, and the avoidance portion is disposed to eliminate the interference between the middle connecting plate 12 and the second connecting plate 23.

In some embodiments, as shown in FIGS. 1, 2, 16, 18 and 19, the second connecting plate 23 is provided with a second window 231 at a position corresponding to the first elastic member 42. The first elastic member 42 includes a second indicator 49 at a position corresponding to the second window 231, and the second connecting plate 23 is provided with a second scale at a position near the second window 231 along the extension direction of the second window 231.

In this embodiment, the second connecting plate 23 includes a second window 231 at a position corresponding to the first elastic member 42. It is easy to observe the elongation of the first elastic member 42 through the second window 231, and then roughly estimate whether it matches the weight of the equipment to be lifted, and whether it is necessary to perform adjustment, avoiding an unnecessary adjustment process.

The second scale may be engraved on the periphery of the second window 231 employing silk-screen printing or laser printing, and the second scale may show the actual weight value of the equipment to be lifted or have a certain correspondence with the actual weight of the equipment to be lifted. The weight of the equipment to be lifted can be estimated by the position of the second indicator 49 and its corresponding scale on the second window 231, which helps to identify whether the weight of the equipment to be lifted is over the rated weight capacity. It should be according to the actual situation to decide whether the second adjusting screws 46 need to be adjusted to make the first elastic member 42 match with the weight of the equipment to be lifted. Specifically, the second indicator 49 corresponding to the second window 231 may be disposed at an end of the second window 231 away from the second adjusting screw 46.

Reference numerals used in this application include: 10: First frame assembly; 11: First frame; 111: First sidewall; 112: Guide rail; 113: Stop portion; 12: Middle connecting plate; 121: First hinge joint; 122: Second hinge joint; 13: Mounting bracket; 20: Second frame assembly; 21: Second frame; 211: Second sidewall; 212: Side wheel; 213: Fitting section; 22: First connecting plate; 221: Second rotating shaft; 2211: Gear; 222: Assembly portion; 23: Second connecting plate; 231: Second window; 232: Guide wheel; 24: Front cover; 241: First window; 30: Rotation assembly; 31: First rotating member; 311: Protruding portion; 312: First rotating shaft; 313: Cam; 32: Second rotating member;

40: Balance assembly; 41: Elastic arrangement; 411: Third elastic member; 42: First elastic member; 421: Threaded sleeve; 43: Second elastic member; 44: Connecting member; 441: Connecting adaptor; 45: First adjusting screw; 46 Second adjusting screw; 47: First indicator; 48: First scale; 49: Second indicator; 50: Stop assembly; 51: First baffle; 52: Second baffle; 53: Stop connecting element; 531: Third sidewall; 5311: Pin hole; 532: Bottom wall; 54: Stop pin; 55: Sliding slot; L: First direction; W: Second direction; H: Third direction.

It is to be noted that, in this document, relational terms such as first and second are used only to distinguish one entity or operation from another, and do not necessarily require or imply any such actual relationship or order between those entities or operations. Furthermore, the terms "including", "comprising", or any other variant thereof, are intended to cover non-exclusive inclusion, such that a process, method, article, or apparatus comprising a set of elements includes not only those elements, but also other elements not expressly listed, or also includes elements that are inherent to such process, method, article or apparatus. Without further limitation, the fact that an element is defined by the phrase "includes a . . . " does not preclude the existence of additional identical elements in the process, method, article, or apparatus.

The various embodiments in this specification are described in a related manner, and it is sufficient to refer to each embodiment for the same and similar parts of each embodiment, and each embodiment focuses on the differences from the other embodiments.

The foregoing detailed description has been given for understanding exemplary embodiments of the invention and no unnecessary limitations of the claims should be understood. Any modifications, equivalent substitutions, or improvements made within the spirit and principles of the present invention are included in the scope of protection of the present invention.

What is claimed is:

1. A height-adjustable mount, comprising:
a first frame assembly, a second frame assembly, a rotation assembly, and a balance assembly;
wherein the first frame assembly is slidable along the second frame assembly;
the first frame assembly comprises a first frame and a middle connecting plate connected to the first frame;
the rotation assembly includes a first rotating member and a second rotating member, wherein one end of the first rotating member rotationally couples with a bottom of the second frame assembly, wherein another end of the first rotating member rotationally couples with one end of the second rotating member, and another end of the second rotating member rotationally couples with the middle connecting plate; and the balance assembly includes an elastic arrangement, an upper end of the elastic arrangement is connected to a first adjusting screw connected to a top of the second frame assembly, wherein a lower end of the elastic arrangement is connected to the first rotating member.

2. The height-adjustable mount according to claim 1, wherein a connection point of the lower end of the elastic arrangement and the first rotating member is located between the two ends of the first rotating member.

3. The height-adjustable mount according to claim 2, wherein the rotation assembly is symmetrically disposed in two groups along a first direction L, the balance assembly includes two elastic arrangements symmetrically disposed along the first direction L, there is a one-to-one correspondence between the rotation assembly and the two elastic arrangements.

4. The height-adjustable mount according to claim 2, wherein the balance assembly further comprises a first elastic member, wherein one end of the first elastic member connects to the first rotating member and another end of the first elastic member connects to the second frame assembly; and/or wherein the balance assembly further comprises a second elastic member, wherein one end of the second elastic member connects to the second rotating member, and another end of the second elastic member connects to the middle connecting plate.

5. The height-adjustable mount according to claim 4, wherein the balance assembly further includes a connecting member, and the first rotating member includes a protruding portion disposed along a width direction of the first rotating member;

the second frame assembly includes a second frame and a first connecting plate disposed at the bottom of the second frame;

the first connecting plate is provided with a rotating shaft that is located above the protruding portion;

the connecting member is provided around the second rotating shaft;

one end of the connecting member is connected to the elastic arrangement, and another end of the connecting member is connected to the protruding portion;

the connecting member comprises a chain or a rope.

6. The height-adjustable mount according to claim 5, wherein the connecting member is a chain, and a second rotating shaft is provided with a gear; the chain is disposed around a gear and meshes with the gear.

7. The height-adjustable mount according to claim 5, wherein the first adjusting screw is used for adjusting a stretched length of the elastic arrangement.

8. The height-adjustable mount according to claim 5, wherein the first frame is provided with a guide rail parallel to the middle connecting plate; the second frame is provided with a side wheel; and the guide rail cooperates with the side wheel to allow the first frame assembly to slide relative to the second frame assembly.

9. The height-adjustable mount according to claim 8, wherein the side wheels are arranged in two columns along the sliding direction of the first frame assembly, every other center of the circles of the two columns of the side wheels is aligned, and each column of side wheels respectively cooperates with a front sidewall or a rear sidewall of the guide rail.

10. The height-adjustable mount according to claim 5, wherein the first frame is provided with two stop portions that are disposed at the top and bottom of the first frame; the bottom of the second frame is provided with a fitting section for cooperating with the stop portion so that controlling the sliding distance of the first frame.

11. The height-adjustable mount according to claim 5, further comprising a front cover disposed on or in a front side of the second frame assembly; the front cover is provided with a first window at a position corresponding to the elastic arrangement; the front cover comprising a first scale at a position proximate to the first window.

12. The height-adjustable mount according to claim 4, wherein the balance assembly further includes a connecting member, the connecting member is a chain, one end of the connecting member is connected to the elastic arrangement, and another end of the connecting member is connected to the first rotating member; a gear is provided on the second frame assembly, the chain is disposed around the gear and meshes with the gear.

13. The height-adjustable mount according to claim 4, further comprising a second adjusting screw;

wherein the second frame assembly is provided with an assembly section disposed above a connection joint of the first rotating member and the second frame assembly;

one end of the second adjusting screw is rotationally connected to the assembly section, and another end is connected to the first elastic member, adjusting the second adjusting screw to retract or extend the first elastic member.

14. The height-adjustable mount according to claim 4, wherein the height-adjustable mount further comprises a second connecting plate positioned in front of the first frame assembly, and edges of the second connecting plate are fixedly connected to the second frame assembly; the second connecting plate includes at least two guide wheels; the guide wheels are disposed on two sides of the middle connecting plate, and circumferential walls of the guide wheels can be contacted with two sides of the middle connecting plate.

15. The height-adjustable mount according to claim 14, wherein the second connecting plate is provided with a second window at a position corresponding to the first elastic member; the first elastic member includes a second indicator at a position corresponding to the second window, and the second connecting plate is provided with a second scale at a position near the second window.

\* \* \* \* \*